May 1, 1934.  W. A. ROTH  1,957,080

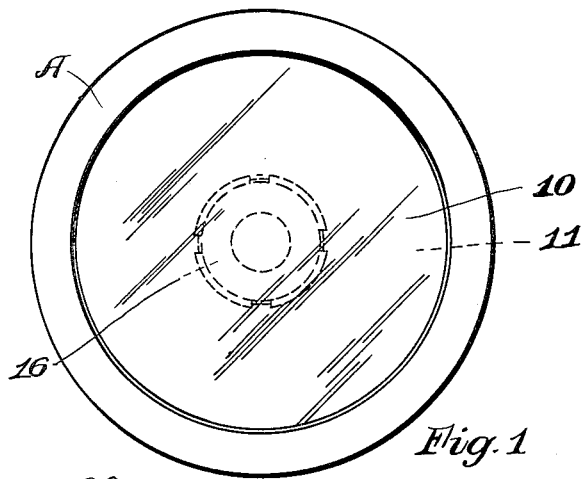
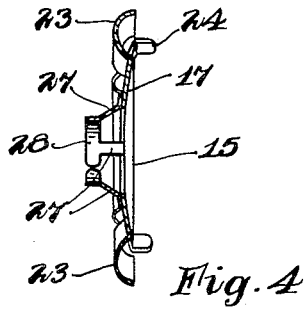
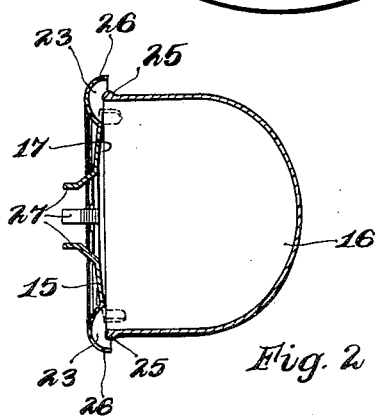
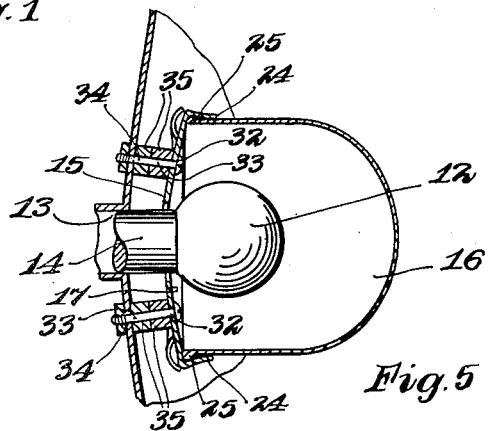
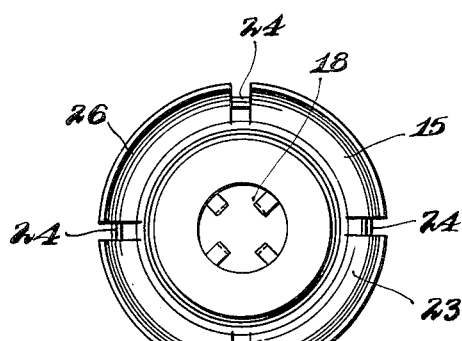
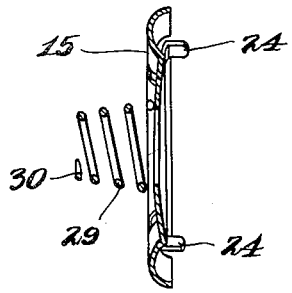

LIGHT SHIELD

Filed Aug. 25, 1930  2 Sheets-Sheet 2

Inventor
William A. Roth

By Amand Rischer
Attorney

Patented May 1, 1934

1,957,080

UNITED STATES PATENT OFFICE 1,957,080

LIGHT SHIELD

William A. Roth, St. Paul, Minn., assignor to Roth No-Glare Lite Co., St. Paul, Minn., a corporation of Minnesota Application August 25, 1930, Serial No. 477,559

7 Claims. (Cl. 240—48.6)

My invention relates to an improvement in light shields particularly for use in connection with automobile headlights, to provide a source of non-glaring light.

It is the object of my invention to form a light which will adequately and effectually illuminate the roadway, and at the same time eliminate glare ordinarily projected from automobile headlights and reflectors, making night driving safer and easier.

It is the object of my invention to encase the light bulb within an auxiliary casing, having a reflector and a light diffusing element associated with this reflector in such a manner that all of the light from the bulb passing through the main headlight lens will first be diffused by passing through the diffusing element. In this manner the light issuing from the bulb is projected in a white non-glaring beam of light which will not blind the drivers of vehicles approaching from the opposite direction.

It is an object of my invention to provide a means of ventilating the auxiliary reflector and diffusing element by a novel means in which none of the light within the auxiliary reflector and lens is permitted to escape from the same without passing through the light diffusing element; or, if any portion of the light is allowed to escape therefrom, this light is not permitted to be projected from the headlight main lens. This feature permits the auxiliary reflector and diffusing element to be ventilated without the issuance of direct light rays from the same. This is very important, as it has been found that ventilation is necessary to prevent overheating of the bulb and stem of the bulb, and at the same time the issuance of light rays to be projected directly through the headlight lens without passing through the diffusing element defeats the very purpose of the invention.

The manner of securing the reflector for the diffusing element to the main headlight in a manner to fit the headlight of any car is a novel feature of my invention.

It is also a feature of my invention to hold the reflector resiliently and securely adjacent the shank of the light bulb. This resilient or spring means is formed upon, or attached to, the auxiliary reflector which holds the same under spring tension against the bulb stem. In this manner the light shield unit is cushioned against jarring by the spring means, the reflector is held firmly to the bulb shank, and at the same time the reflector may be easily and simply removed or replaced when desired. If it is not convenient to secure this resilient spring means to the bulb stem, it is possible to secure the auxiliary reflector by means of resilient strips to the main reflector itself.

In the drawings forming a part of this specification:

Figure 1 is a front view of my headlight, showing the diffusing element in place.

Figure 2 is a cross-sectional view through the center of my light shield and diffusing element unit.

Figure 3 illustrates a front view of the reflector shown in Figure 2, with the diffusing element removed.

Figure 4 is a cross-sectional view of an alternate form of reflector.

Figure 5 is a cross-sectional view through the center of another alternate form of light shield.

Figure 6 is a cross-sectional view of another alternate form of reflector.

Figure 7:
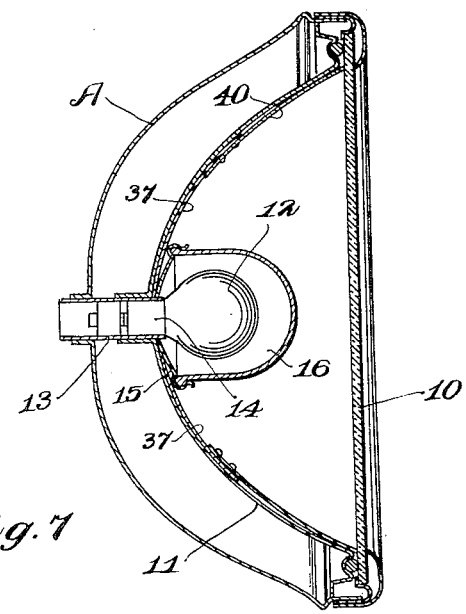
Figure 7 is a cross-sectional view through the center of a headlight, illustrating still another means of supporting my auxiliary reflector.

With reference to the drawings, the headlight A is provided with a lens 10 and a reflector 11 in the usual manner, well known in the art. The light bulb 12 is adapted to be inserted in the proper socket 13, the stem 14 of the bulb extending into the socket to hold the bulb in place within the reflector 11. This is also common construction, and is used in all automobile headlights of which I am aware. The socket 13 extends through the reflector 11 a sufficient distance to position the bulb away from the reflector in order to place the bulb in proper focus with the reflector.

My auxiliary reflector 15 and light diffusing element 16 which it supports, is adapted to be secured about the inwardly extending end of the socket 13. In this manner the reflector is supported behind the bulb 12, and the light diffusing element 16 is supported by the reflector in a manner to enclose the bulb 12, emitting a soft white light which is projected by the reflector 11 through the lens 10 of the headlight A.

My auxiliary reflector 15 is provided with a slightly concave surface 17, having a hole 18 centrally disposed therein which is sufficiently large to space the reflector from the socket 13, as it has been found that the reflector 15 when fitting tightly about the stem 14 transmits heat from the reflector 15 to the stem 14, heating the stem to a high temperature, and causing danger of melting the sealing compound within the stem 14 and loosening the bulb 12.

In order that the reflector 15 and diffusing element 16 be ventilated to prevent overheating of the bulb, I form the reflector 15 with a circular groove 23, as illustrated in Figures 2 and 3 of the drawings. Spaced at intervals about this groove 23, lips 24 are cut from the body of the material. These lips 24 are formed to continue on approximately the same curve as the concave surface of the reflector 15 to a point slightly beyond the center of the groove 23, and are then bent outwardly at right angles to the reflector 15. This formation is for the purpose of suspending the light diffusing lens spaced from the surface of the groove 23, the diffusing element 16 being of proper diameter along the beaded inner rim thereof to be spaced from the outer edge of the groove 23. It may be seen that light from the bulb, passing between the lower rim 25 of the diffusing element 16 and the surface of the groove 23 will be reflected back into the diffusing element 16 by the outer wall 26 of the groove. In this manner no light may be projected directly out between the lower rim 25 of the diffusing element 16 and the reflector 15 but must pass through the diffusing element 16. At the same time, however, the lens is well ventilated, and air may pass along the inner surface of the reflector continuously, acting to cool the same.

In Figures 2 and 3 of the drawings, I have illustrated a particular means of securing the reflector 15 in place behind the bulb 12. In this particular form of reflector, the opening 18 is provided with a number of spring clips 27 extending from the inner edge of the hole 18. These spring clips are preferably bent from a part of the material forming the reflector 15, and are adapted to fit or bear against the socket 13 when the reflector 15 is in place within the headlight A, holding the reflector and attached lens 16 resiliently in place about the bulb 12.

In Figure 4 of the drawings, I form a spring means of quite a similar form, this type being equipped, however, with a spring collar 28 upon the free ends of the spring clips 27. This spring collar 28 is split, and when placed about the socket 13 of the bulb 12, is held there tightly by the spring tension of the collar 28 and of the spring clips 27. In forming a reflector of this type, the spring clips are either formed integrally with the reflector, and the collar then attached to the free ends of these spring clips, or else the clips and collar are formed as a unit, and attached to the body of the reflector 15, as illustrated in the drawings.

In Figure 6 of the drawings, the spring clips of the modification illustrated in Figures 2 and 3 have been replaced by a short section of coil spring 29. One end of the coil spring 29 is secured to the reflector 15 by soldering or by holding the coil by means of lugs formed from the body of the reflector and bent over the end coil. The free end 30 of the coil spring 29 is of the proper size for insertion about the stem 14 of the bulb 12, with sufficient tension to insure the resilient and secure suspension of the reflector 15 at all times.

In the modification of reflector 15 illustrated in Figure 5 of the drawings, I disclose a reflector 15 having a pair of oppositely disposed holes 32 through the same. Similar holes are formed through the reflector 11. Bolts 33 are extended through the holes 32 in the reflector 15 and the holes 34 in the reflector 11. Resilient washers 35 are placed to space the reflector 15 from the reflector 11. This method is particularly adaptable where the socket of the bulb 12 does not project through the reflector 11 a sufficient distance to allow one of the previously described reflectors to be utilized.

Figure 8:
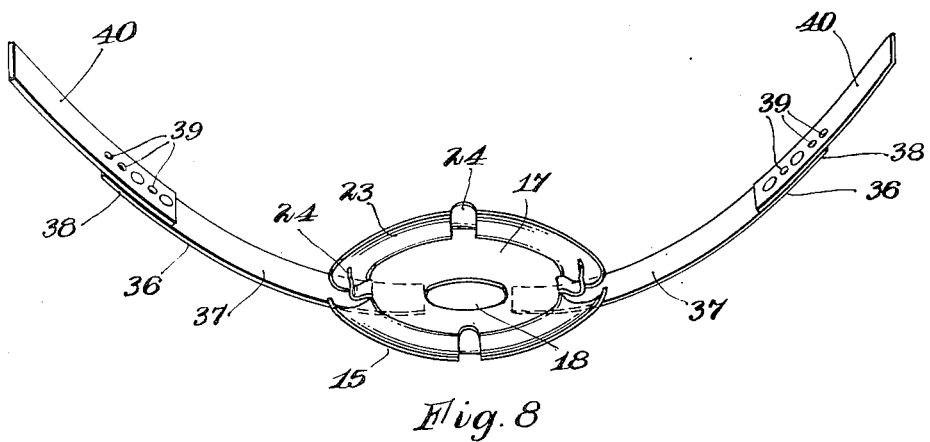
Figure 8 is a perspective view of the reflector and supporting means shown in Figure 7.

In Figures 7 and 8 of the drawings I have illustrated a reflector 15 being resiliently supported by means of a pair of adjustable strips 36. A short strip of metal or other suitable material is secured integrally upon either side of the center of the reflector 15, on the rear side thereof. These strips of metal 37 project from the reflector 15 in opposite directions. The ends 38 of these strips 37 are formed with a number of holes 39 by which they may be adjustably secured with bolts to strips 40. The ends of the strips 40 are adapted to bear against the glass pane or lens 10 of the headlight A, the strips 40 and 37 bending along the contour of the reflector 11, and the reflector 15 being held in proper position in the center of the reflector 11. This type of fastening may also be used where the bulb socket does not project more than a short distance through the reflector 11.

In each of the above modifications of reflectors 15, it is apparent that none of the light is allowed to pass out of the diffusing element and auxiliary reflector except that passing through the element 16. The light passing between the lower rim of the element 16 and the reflector 15 is reflected back by means of the outer wall of the groove 23. Any light passing through the hole 18 about the stem of the bulb 12 is reflected directly back in the same manner by the reflector 11 adjacent the stem of the bulb 12. Therefore, very little of the light is lost, while at the same time the reflector 15 and diffusing element 16 are well ventilated, air being allowed to pass freely on both sides of the same.

The manner in which my reflector and lens are inserted into the headlight A is believed obvious. The lens 10 is removed, the bulb 12 removed, and the reflector 15 inserted into place. The bulb 12 is then replaced, and the diffusing element 16 inserted between the lips 24, which hook about the beaded lower edge or rim 25 of the element 16. The lens 10 is then replaced, and the operation is complete.

In accordance with the patent statutes, I have described the principles of operation of my light reflector, and while I have endeavored to set forth the best embodiment thereof, I desire to have it understood that this is only illustrative of a means of carrying out my invention, and that obvious changes may be made within the scope of the following claims without departing from the spirit of the invention.

I claim:

1. An electric light glare shield unit including, an auxiliary reflector adapted to be supported by the shank of the electric light bulb, resilient attaching means formed on said reflector, a cup-like translucent light diffusing element supported by said reflector, and an annular bead-like overlapping flange formed in said reflector adapted to overlap and be spaced adjacent to the annular edge of said element to provide an open heat escapement passageway thereabout.

2. A light diffusing element including, a reflector adapted to be supported adjacent a light bulb, resilient attaching means formed on said reflector, a cup-like translucent light diffusing element supported by said reflector, and an annular bead-like overlapping flange formed in said reflector adapted to overlap and be spaced adjacent to the annular edge of said element to provide an open heat escapement passageway thereabout.

3. A light diffusing unit for the electric light of a headlight including, a reflector, a diffusing element, fingers on said reflector for supporting said element, and grooves formed in said reflector between said fingers to space said reflector from said element to provide a ventilating space therebetween.

4. A light diffusing unit including, a reflector, an integral circular groove reflector encircling said first named reflector, a diffusing element, and means for supporting said element spaced from said groove of said reflector to provide ventilating space between said reflector and said element.

5. An electric light glare shield including, an auxiliary reflector adapted to be supported by the shank of the electric light bulb, an annular groove in said reflector, ears cut from the edge of said reflector to the inner edge of said groove, a translucent light diffusing element secured to said reflector, and held spaced from the groove by said ears to provide ventilating passageways.

6. An electric light glare shield including, an auxiliary reflector adapted to be supported by the shank of the electric light bulb, an annular groove in said reflector, ears extending from said reflector adjacent the inner edge of said groove, and a translucent light diffusing element secured to and spaced from said reflector by said ears.

7. An electric light glare shield including, an auxiliary reflector adapted to be supported by the shank of the electric light bulb, an annular groove integral with and encircling said reflector, a cup-shaped translucent element, a rim edge on said element approximately equal in diameter to the center of the groove, and means for supporting said element spaced from the groove to provide ventilating passageways therebetween.

WILLIAM A. ROTH.